Nov. 17, 1970 C. J. HALL ET AL 3,541,242

COLOR TEMPERATURE CORRECTION CONTROLLED BY THE COLOR KILLER AND COLOR OSCILLATOR

Filed Dec. 16, 1968

INVENTORS, CYRIL J. HALL & RENÉ PETER

BY Eugene M. Whitacre

ATTORNEY 3,541,242
COLOR TEMPERATURE CORRECTION CONTROLLED BY THE COLOR KILLER AND COLOR OSCILLATOR

Cyril J. Hall, Horgen, and René Peter, Basel, Switzerland, assignors to RCA Corporation, a corporation of Delaware Filed Dec. 16, 1968, Ser. No. 783,915
Claims priority, application Great Britain, Aug. 27, 1968, 40,979/68
Int. Cl. H04n 9/48
U.S. Cl. 178—5.4 9 Claims

ABSTRACT OF THE DISCLOSURE

A transistor is used to switch the drive level to a color kinescope between a relatively high color temperature when receiving monochrome transmissions to a lower color temperature when receiving color transmissions. The transistor collector-to-emitter impedance is controlled from a biasing source coupled to provide a low capacitive reactance to the base electrode. The source provides biasing levels under the influence of the color killer circuitry.

This invention relates to television receivers and more particularly to compatible color television receivers for both monochrome and color transmissions.

Color television receivers that are also used for the reception of monochrome transmissions have to meet two conflicting requirements regarding the color temperature set-up of the picture tube. For color reception the standard reference white corresponds to a color temperature of 6500° K. For monochrome reception a white signal that approximates that of monochrome picture tubes is desirable since in this way the color receiver will have a monochrome picture similar to that provided by monochrome receivers. This requires a color temperature in the range of 9,000–10,000° K. A further advantage of a high color temperature is increased light output for a given beam current and a subjective improvement in contrast.

It is common practice to set the color temperature to a high value (e.g., 9,300° K.) for both monochrome and color reception, then attempt to reduce subjectively the consequent color errors in the color picture by departure from the normal values of the color signal amplitudes, for example, by reducing the relative amplitude of the (G–Y) signal. A more satisfactory procedure is to switch the color temperature between a high value for monochrome reception and a lower value for color reception. Prior color temperature switching systems employing mechanical relays, or the like, are expensive to build or affect the frequency response of the video signal channel in an undesirable manner.

It is an object of the present invention to provide an improved color temperature switching circuit for color television receivers. A color temperature switching circuit embodying the invention includes an amplifier device, operating as a switch, connected in the drive control circuit for one or more of the electron guns associated with a color kinescope. The amplifier device is switched between "on" and "off" conditions under the control of the color killer circuit normally found in color television receivers. In order that the amplifier device exhibit a low capacitance to the kinescope drive control circuit, the control voltage which switches the amplifier from the "on" to the "off" conditions should be derived from a low capacitance source. To this end a high frequency wave, which may be derived from the color oscillator, is rectified to develop a direct voltage. The color killer controls the amount of developed direct voltage and thereby controls the switching of the amplifier device. Since the signal being rectified is of high frequency, the amount of filter capacitance required is relatively low, thus permitting the bias circuit to present relatively low capacitance to the amplifier device.

Reference is now made to the following description taken in conjunction with the accompanying drawing in which.

Although the receiver to be described is for NTSC signals, the invention is applicable to other transmission standards such as PAL or SECAM.

Figure 1:
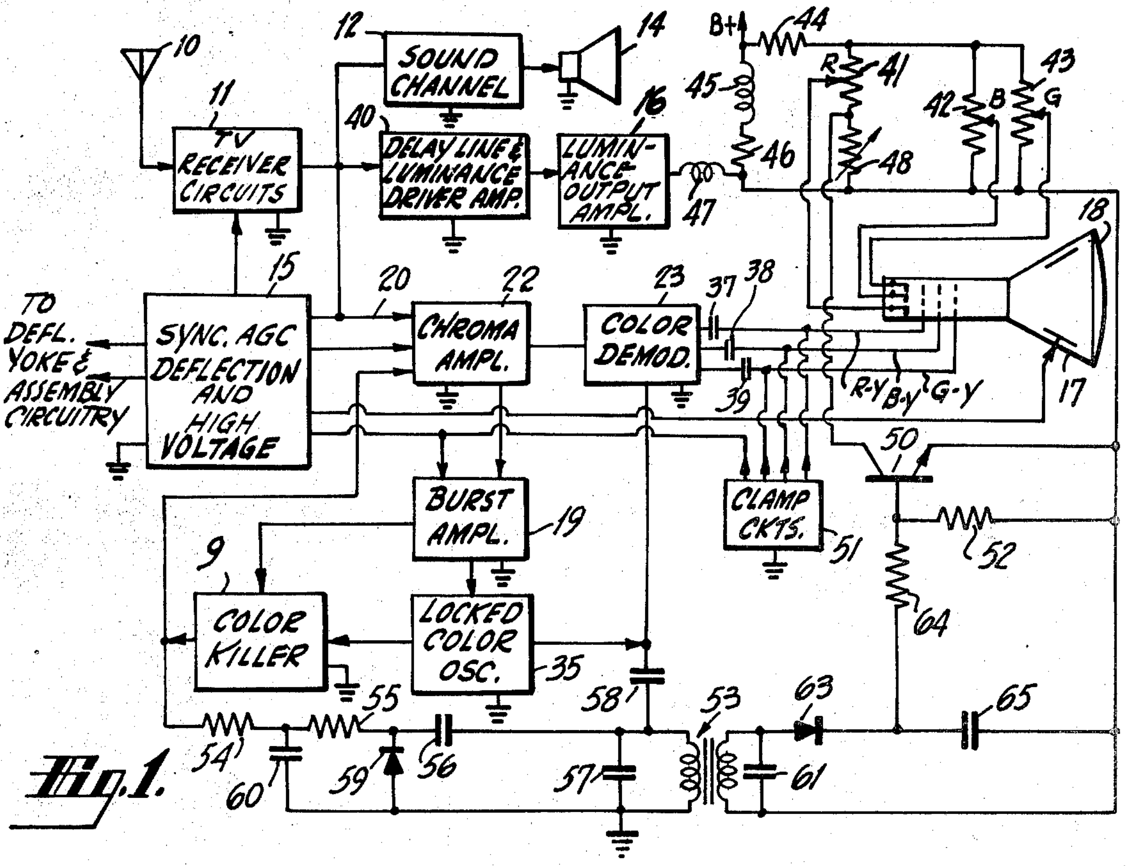
FIG. 1 is a schematic circuit diagram partially in block form of a television receiver embodying the present invention.

Referring to FIG. 1 an antenna 10 is coupled to the input terminals of a television signal receiver. The receiver circuits 11 includes the tuner, the intermediate frequency (I.F.) amplifier, video detector and the subcarrier sound detector. The sound detector provides a sound wave for application to sound channel 12 which drives loudspeaker 14.

The detected video signal is applied to the sync, AGC, deflection and high voltage circuits 15. Vertical and horizontal deflection signals are applied to a deflection yoke, not shown, and the necessary high voltages are generated and applied to the ultor electrode 17 of the color kinescope 18.

The composite video signal is applied by way of a conductor 20 to a chroma amplifier 22 which is coupled to an input of color demodulator 23. A burst amplifier 19 keyed by a gate pulse from the deflection and high voltage circuit 15 retrieves the color synchronizing burst from the chrominance signal also applied thereto. The bursts are used to synchronize the color subcarrier oscillator 35. The output of oscillator 35 is applied to a color demodulator 23 which operates on the chrominance signals also applied thereto to provide color difference signals indicated as the R–Y and B–Y and G–Y.

The D.C. components of the color difference signals are restored by means of synchronous clamping circuits 51. The circuit 51 is driven by a pulse derived from a blanker amplifier included in the deflection and high voltage circuits 15. The clamp circuits 51 provide a D.C. path to ground for each of the three control electrodes of the kinescope 18. The color difference signals are applied to the corresponding control electrodes of the kinescope 18 by means of coupling capacitors 37, 38 and 39.

The demodulated video signal is also applied by way of the delay line, luminance driver amplifier 40, and the luminance output amplifier 16 to the cathodes of the color kinescope 18. Luminance amplifier 16 which may include a transistor or vacuum tube device has a load comprising individual potentiometers or adjustable resistor means for each of the control electrodes designated as R, B and G and referenced as 41, 42 and 43.

Operating potential (B+) is coupled to a common terminal of each potentiometer 41, 42 and 43 through a resistor 44. The variable arm of each potentiometer is coupled to the respective cathods electrode of the kinescope 18. B+ is also applied to the output terminal of amplifier 16 through an RF coil 45, a load resistor 46, and a series peaking coil 47, the coil 47 being returned to ground through the amplifier stage 16.

The junction between coil 47 and resistor 46 is coupled to a terminal of another red control potentiometer 48 in series with potentiometer 41. The junction of coil 47 and resistor 46 is also coupled to the common terminal of the blue and green potentiometers 42 and 43.

The terminals of the variable resistor 48 are shunted by the collector to emitter path of transistor 50. The base electrode of transistor 50 has applied thereto a control signal whose magnitude is determined by the action or operation of a color killer circuit 9. Color killer circuit 9 has an output terminal coupled to an input terminal of the chroma amplifier 22. The input signal applied to the color killer circuit 9 is obtained from the output of the burst amplifier 19. Basically, the color killer circuit 9 serves to monitor the presence or absence of the burst signals and will operate to disable the chrome channel 22 during a monochrome transmission. The output terminal of the color killer circuit 9 is also coupled to a tuned primary winding of a transformer 53 through a low pass filter network, comprising a capacitor 60 and resistors 54 and 55, which are in series with a coupling capacitor 56. The low pass filter network also drives a diode 59.

A high frequency signal (3.58 mHz.) from the color oscillator 35 is coupled to the transformer 53 primary winding through a coupling capacitor 58. A capacitor 57 is selected to resonate with the primary winding of transformer 53 at approximately the color oscillator frequency.

A secondary winding of tarnsformer 53 is mutually coupled to the primary winding and is also tuned by means of capacitor 61 to resonate therewith at the color oscillator frequency. A rectifier diode 63 in series with a pair of resistors 64 and 52 is connected across the secondary winding. The resistors 64 and 52 are bypassed by a capacitor 65.

During a color transmission, color bursts appear, and the color killer circuit 9 provides a D.C. voltage at its output which permits or enables the chroma amplifier 22 to operate. This voltage is of a polarity to reverse bias diode 59. Under these conditions, the tuned primary circuit of transformer 53 develops a voltage at the color oscillator frequency which is coupled to the secondary winding. The high frequency signal is rectified by diode 63 to charge capacitor 65 to a potential which forward biases the base-emitter junction of transistor 50. The transistor 50 thus exhibits a low impedance path across variable resistor 48 serving to increase the red drive to the cathode electrode of the red electron gun of kinescope 18. An increase in the red drive provides the low color temperature desired for color reproduction.

For a monochrome transmission the output of the color killer circuit 9 provides a voltage which is more negative than that developed during a color transmission. The negative voltage, in addition to disabling the chroma amplifier 23 forward biases diode 59. In the forward biased condition, diode 59 loads the primary tank circuit causing very little of the color oscillator voltage to be developed thereacross. As a result, the signal coupled to the secondary winding diminishes greatly and the rectified voltage developed across capacitor 65 is not sufficient to forward bias the transistor 50. In this mode the transistor 50 exhibits a high impedance across the resistor 48. Thus the drive to the red gun is decreased, which in turn gives a higher color temperature for the monochrome transmission. The arrangement shown in FIG. 1 possesses the following advantages.

The transistor 50 is driven from a biasing circuit with a very low capacitance to ground. The low capacitance results from the use of the 3.58 megahertz signal as a bias source, the relatively high frequency requiring a lower value of filtering capacitor 65 than a lower frequency source. The capacitor 65 can easily be isolated from the transistor 50 base circuit by resistor 64. Furthermore due to the use of the transformer coupled to the circuit only a small voltage from the color oscillator is required, which voltage may be stepped-up to the desired level. This means that the capacitor 58 can be relatively small (i.e., on the order of a few micromicrofarads). Therefore, the loading on the color oscillator is low, and little capacitive reactance is deflected to the secondary circuit of transformer 53. By using the 3.58 megahertz reference source as a biasing supply, no appreciable additional load requirements are placed on the color killer circuitry 41 of the receiver.

The voltage and current requirements for transistor 50 are relatively modest and consequently a low cost transistor can be used. Due to the capacitive isolation afforded by the base circuit biasing source, the collector capacitance inherent in transistor 50 is held to a low value. It may be noted that shunt capacity in the drive circuits of the kinescope undesirably affects the frequency response of the luminance output amplifier 16.

Transformer 53 should preferably be designed to provide low signal attenuation at the frequency of 3.58 megahertz and to have low primary to secondary winding capacitance.

Figure 2:
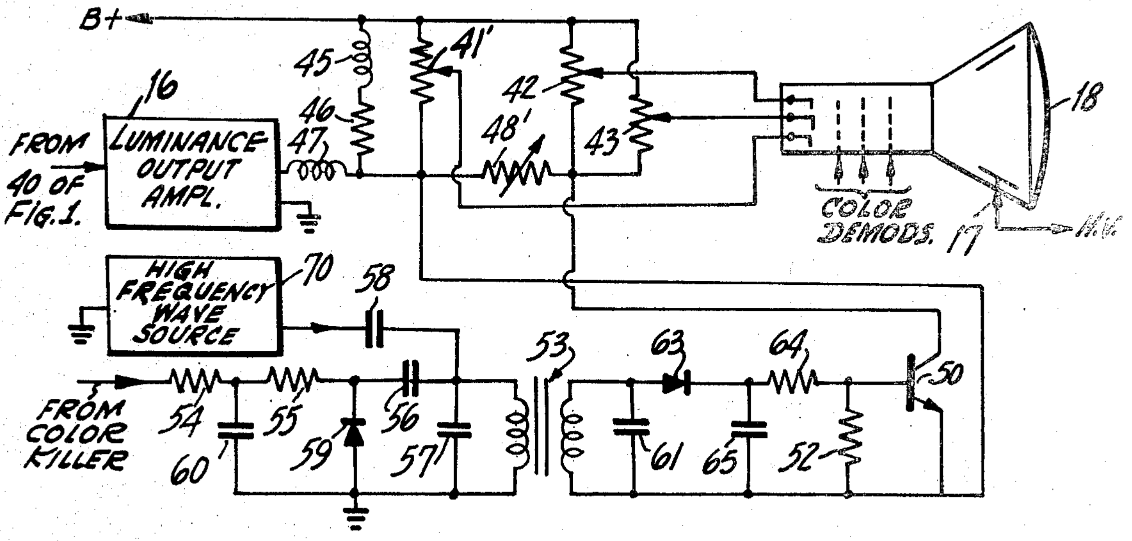
FIG. 2 is a schematic circuit diagram partially in block form of another embodiment according to the invention.

FIG. 2 shows a color temperature switching circuit which automatically reduces the magnitude of the green and blue drives during a color transmission and in this manner effectively increasing the red drive. The same reference numerals have been retained in FIG. 2 to indicate similar functioning components. The luminance output amplifier 16 is connected to the drive potentiometers 41', 42 and 43 for the red, green and blue guns respectively. The potentiometer 48' is connected between the junction of red potentiometer 41' and coil 47 and the common junction between potentiometers 42 and 43. The collector to emitter path of transistor 50 is coupled across the terminals of potentiometer 48'. A high frequency wave source 70 is coupled to the primary winding of a transformer 53 through a coupling capacitor 58. The source 70 may comprise a separate oscillator or circuitry for deriving a suitable signal from the horizontal circuitry included in the receiver. For different sources the transformer 53 would be selected so that its primary and secondary inductances would resonate at that source frequency with the capacitors 57 and 61 shunted respectively thereacross. When the high frequency wave is rectified by diode 63 to forward bias the transistor 50, the resistor 48' is bypassed and the blue, green and red drives to the kinescope 18 are increased. This condition defines monochrome operation. Therefore, for monochrome operation diode 59 is reversed biased by the color killer signal. Thus the voltage from the color killer goes positive during monochrome reception. Alternatively the color killer voltage may go negative, and the diode 59 connections can be reversed. During color television reception the signal from the color killer becomes more negative, forward biasing diode 59, and effectively shunting the primary tank circuit. Shunting of the primary tank substantially reduces the signal amplitude coupled to the secondary winding. Transistor 50 then becomes reversed biased causing a decrease in the luminance drive to the blue and green guns with respect to that of the red. In this manner the effect is to increase the red drive during a color transmission by decreasing the blue and green drive. A circuit which performed according to the above description utilized the following components.

Resistor 41—15 kilohms
Resistors 42, 43—7 kilohms
Resistor 44—6.8 kilohms
Resistor 46—5.6 kilohms
Resistor 48—4 kilohms
Resistor 52—10 kilohms
Resistors 54, 55—100 kilohms
Resistor 64—2.7 kilohms
Capacitor 56—1,000 micromicrofarads
Capacitor 57—220 micromicrofarads
Capacitor 58—2.7 micromicrofarads
Capacitor 60—.01 microfarad
Capacitor 61—220 micromicrofarads
Capacitor 65—.01 microfarad
Transistor 50—BC107
Diode 59—BA100
Diode 63—OA90

The components as indicated above were utilized in a configuration as shown in FIG. 1 and operated as described for FIG. 1 from a color killer source which provided a negative 10 volt signal during a monochrome transmission, and a signal of approximately zero volts during a color transmission. The input signal from the subcarrier oscillator is coupled to the input terminal of capacitor 58 was approximately 20 volts peak to peak.

What is claimed is:

1. A color temperature switching system for color television receivers adapted to receive both color and monochrome television signal transmissions, said color television receiver being of a type having a color kinescope with a plurality of pairs of input electrodes, a bias circuit for determining the bias voltage between one of said pairs of input electrodes, a color killer circuit providing a control voltage the magnitude of which is different when monochrome television signals are being received from the magnitude when color television signals are being received, comprising:

(a) means in said color television receiver providing a source of high frequency waves,
(b) an amplifying device coupled to at least one of said pairs of electrodes,
(c) a rectifying circuit coupled to said amplifying device to switch said amplifying device between a high impedance condition and a low impedance condition in response to its input signal, and
(d) means responsive to said color killer control voltage for selectively coupling said high frequency waves to the input of said rectifying circuit during the reception of one of said color and monochrome television signals and blocking said high frequency waves during said other signal.

2. The color temperature switching system according to claim 1, wherein said means in said color television receiver providing a source of high frequency signals is the color subcarrier oscillator.

3. A color temperature switching system for color-television receivers adapted to receive both color and monochrome television signal transmissions, said color receiver being of the type having a color kinescope having at least one control electrode for varying the intensity of a current beam, said kinescope being of the type adapted to produce at least two different primary colors, a color killer circuit providing a control voltage the magnitude of which is different when monochrome television signals are being received from the magnitude when color television signals are being received, comprising:

(a) means in said color television receiver providing a source of high frequency waves,
(b) an amplifying device coupled to said at least one control electrode of said kinescope,
(c) circuit means, including a rectifying circuit, coupled between said amplifying device and said high frequency source for switching said device between a high impedance condition and a low impedance condition in response to its input signal and
(d) means responsive to said color killer control voltage for selectively attenuating said high frequency waves as applied to the input of said circuit means during reception of one of said color and monochrome television signals and allowing said high frequency waves to remain substantially unattenuated as applied to said circuit means for said other television signal.

4. The color temperature switching system according to claim 3 wherein said circuit means comprises:

(a) a transformer having a primary and secondary winding,
(b) first and second capacitors coupled respectively across said primary and secondary windings for resonating with said windings at a frequency substantially equal to that of the color subcarrier frequency,
(c) a diode rectifying circuit coupled to said secondary winding for providing a D.C. potential proportional to an A.C. signal across said winding,
(d) means coupled to said primary winding for injecting an A.C. signal of a frequency approximately equal to that of said color subcarrier frequency.

5. The color temperature switching system according to claim 4 wherein said means responsive to said color killer control voltage, comprises:

(a) diode means coupled in shunt with said primary winding,
(b) a resistor coupling said diode means to said color killer to reverse bias said diode means in response to said killer control voltage level appearing at said output, whereby said reversed biased diode means allows said circuit means to operate causing said amplifying device to switch to said low impedance condition.

6. A television receiver adapted to receive color television signals, including a color burst signal, and further to receive monochrome television signals, including, in combination:

(a) a color kinescope having at least one control electrode for applying a signal thereto to vary the intensity of a current beam generated by said kinescope and used for exciting a screen portion of said kinescope adapted to emit a predetermined color of light,
(b) biasing means, including at least one resistor, coupled to said control electrode for applying a specified bias level to said control electrode establishing conditions for a first beam current level,
(c) circuit means responsive to said color burst signal for providing at an output terminal a given voltage level for the presence of said burst signal,
(d) a transistor having a base, emitter and collector electrode, said transistor having the collector to emitter path coupled in shunt with said at least one resistor,
(e) a source of high frequency repetitive signals,
(f) first means coupled between said source and said transistor's base to operate said collector to emitter path of said transistor in a low impedance state in response to said repetitive signal amplitude, said first means further introducing a low capacitive reactance to said transistor's base electrode, whereby said low impedance shunts said resistor introducing a minimum reactance at said control electrode while establishing conditions for a second beam current level,
(g) means coupling said current means to said first means to attenuate said repetitive signal amplitude in a direction to operate said collector to emitter path of said transistor in a high impedance state during the presence of said burst signal, and therefore maintain said conditions for said beam current at said first level.

7. The television receiver according to claim 6 wherein said source of repetitive signals is the color subcarrier oscillator included in said receiver.

8. A television receiver adapted to receive color television signals, including a color burst signal and further adapted to receive monochrome television signals including in combination:

(a) a color kinescope having a control electrode for applying thereto a video signal suitable for varying the intensity of a current beam generated by said kinescope;
(b) an impedance network coupled between said electrode and a source of video signals for determining the level of signals applied to said electrode;
(c) circuit means responsive to said color burst signals for providing at the output terminal thereof a specified voltage level indicative of the presence of said burst signal;

(d) a transistor having a base, emitter and collector electrode, said transistor having the collector to emitter path coupled in shunt with a portion of said impedance network;

(e) a source of high frequency repetitive signals;

(f) first means including a rectifying circuit coupled between said high frequency source and said base electrode of said transistor for providing a D.C. potential proportional to the amplitude of said repetitive frequency source;

(g) second means coupled between said first means and said circuit means for rendering said first means inoperative during the reception if one of said color and monochrome television signals and operative during said other signal to cause said transistor to provide a high impedance between said collector to emitter path for said one signal and a low impedance for said other signal.

9. A color television receiver for both monochrome and color television transmission including in combination:

(a) a color kinescope having at least one pair of input electrodes associated with the reproduction of at least one of a plurality of colors in response to its associated signal drive, which colors are selected to provide upon proper arithmetic combinations both a monochrome or color display, (b) an input circuit coupled between said pair of input electrodes, (c) a semiconductor device, having output electrodes coupled to said input circuit for controlling the signal drive to said input electrodes, and having an input electrode for controlling the impedance between said output electrodes, (d) a source of high frequency waves, (e) rectifying means coupled between said source of high frequency waves and said input electrode for controlling the impedance of said semiconductor device, and (f) means responsive to the reception of color television transmission for controlling the amplitude of said high frequency waves applied to said rectifying means to change the impedance of said semiconductor device during reception of color television transmission and therefore the signal drive to said input electrodes during the reproduction of said one color as compared to the impedance of said semiconductor device and signal drive to said input electrodes during the reception of monochrome television transmissions.

References Cited

UNITED STATES PATENTS 3,463,875 8/1969 Lovely ------------- 178—5.4

ROBERT L. GRIFFIN, Primary Examiner.

G. G. STELLAR, Assistant Examiner.